United States Patent [19]
Carrere et al.

[11] Patent Number: 5,940,285
[45] Date of Patent: Aug. 17, 1999

[54] ELECTRICAL CIRCUIT FOR CONVERTING ELECTRICAL ENERGY HAVING CAPACITORS AND CONTROLLER FOR MAINTAINING A NOMINAL CHARGE ON EACH CAPACITOR

[75] Inventors: Philippe Carrere, Paris; Jean-Paul Lavieville, Gif sur Yvette; Thierry Meynard, Toulouse; Jean-Luc Thomas, Thomery, all of France

[73] Assignee: GEC Alsthom Transport SA, Paris, France

[21] Appl. No.: 08/908,798

[22] Filed: Aug. 8, 1997

[30] Foreign Application Priority Data

Aug. 9, 1996 [FR] France .................................. 96 10047

[51] Int. Cl.$^6$ ...................................................... H02M 3/06
[52] U.S. Cl. .............................................................. 363/62
[58] Field of Search .................................... 363/59, 60, 62

[56] References Cited

U.S. PATENT DOCUMENTS

| 4,807,104 | 2/1989 | Floyd et al. | 363/59 |
| 5,051,881 | 9/1991 | Herold | 363/60 |
| 5,159,543 | 10/1992 | Yamawaki | 363/60 |
| 5,345,376 | 9/1994 | Nourbakhsh | 363/62 |
| 5,463,542 | 10/1995 | Okamoto | 363/60 |
| 5,668,711 | 9/1997 | Lavieville et al. | 363/62 |
| 5,680,300 | 10/1997 | Szepesi et al. | 363/59 |
| 5,706,188 | 1/1998 | Meynard et al. | 363/60 |
| 5,726,870 | 3/1998 | Lavierville et al. | 363/62 |
| 5,737,201 | 4/1998 | Meynard et al. | 363/60 |
| 5,761,058 | 6/1998 | Kanda et al. | 363/60 |
| 5,828,561 | 10/1998 | Lavieville et al. | 363/62 |

FOREIGN PATENT DOCUMENTS

| 0720282A1 | 7/1996 | European Pat. Off. | H02M 7/48 |
| 2679715 | 1/1993 | France | H02M 1/88 |

*Primary Examiner*—Jeffrey Sterrett
*Attorney, Agent, or Firm*—Sughrue, Mion, Zinn, Macpeak & Seas, PLLC

[57] ABSTRACT

A multilevel converter including, in particular, a capacitor for each of its cells, and control means comprising means for evaluating the mean voltage across the terminals of each of the capacitors, means for measuring any difference on each of said capacitors between the evaluated mean charge voltage and the nominal mean charge voltage of the capacitor, and additional control means changing the time positions of the converter control signals in a direction such that the measured difference is reduced.

15 Claims, 6 Drawing Sheets

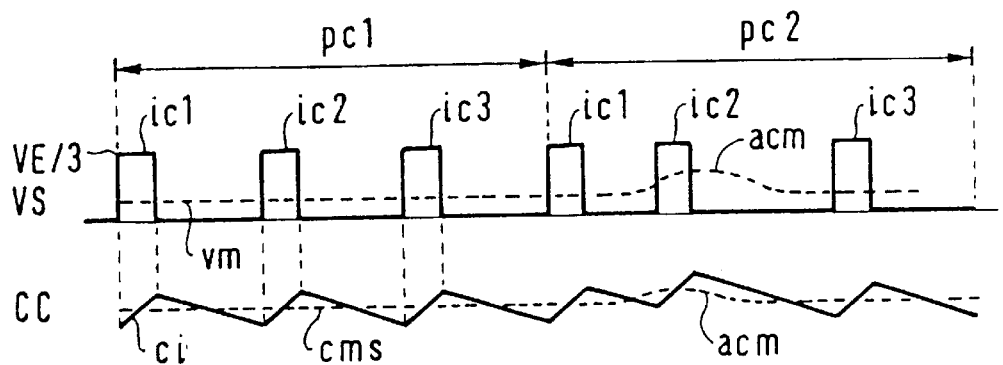
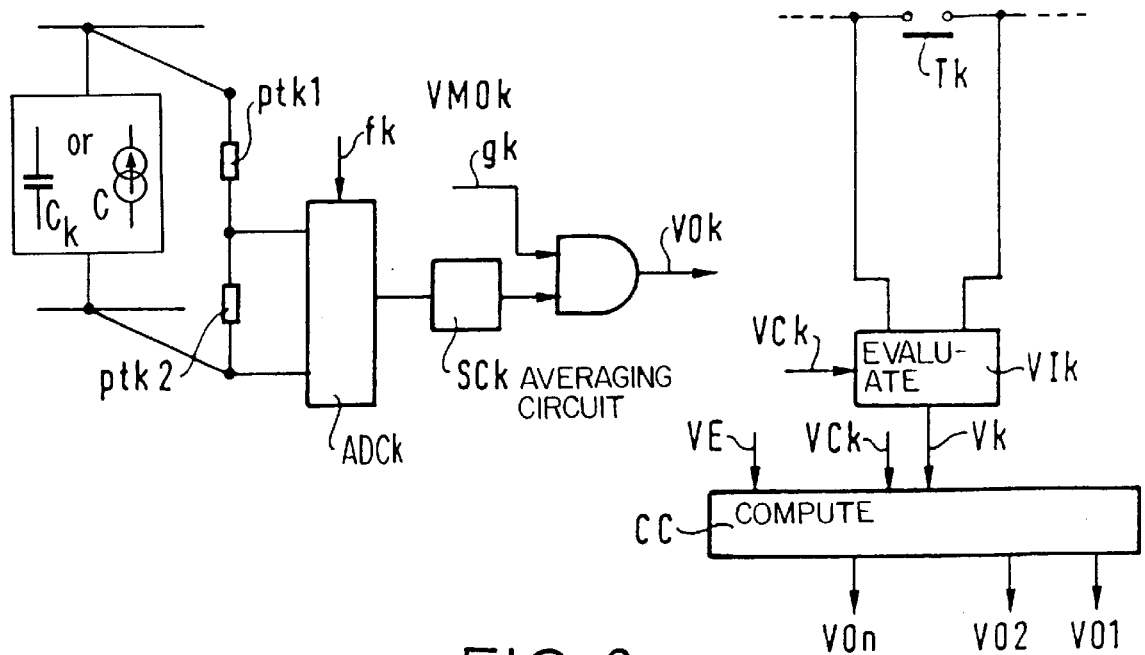
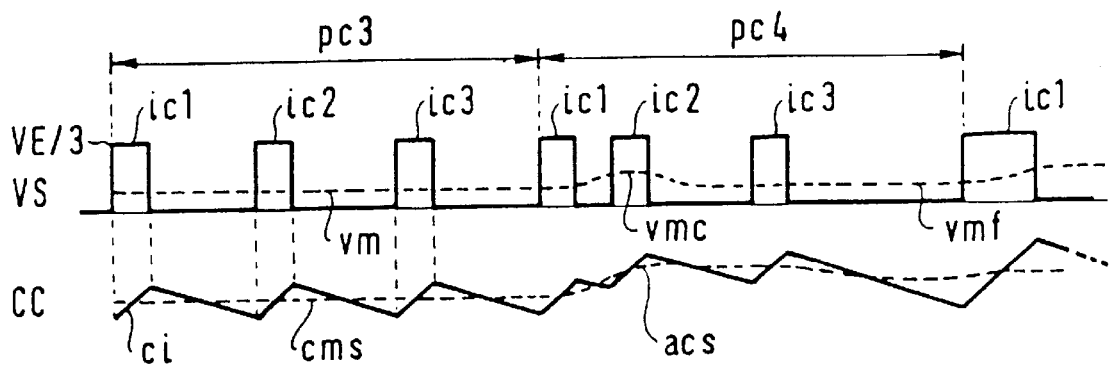

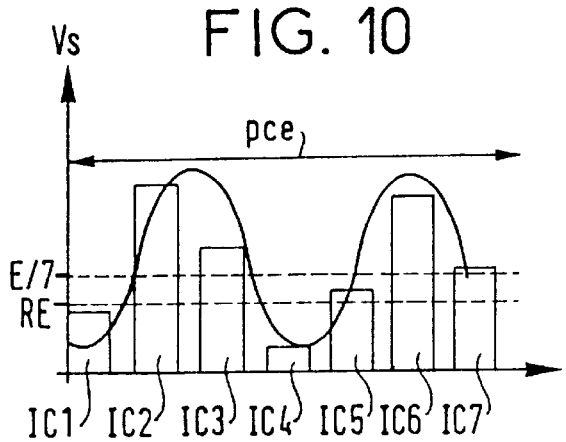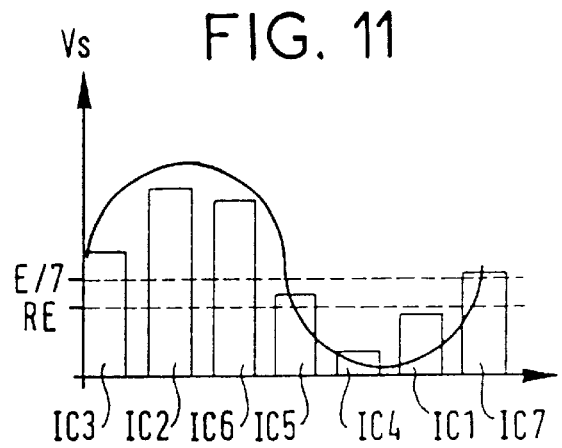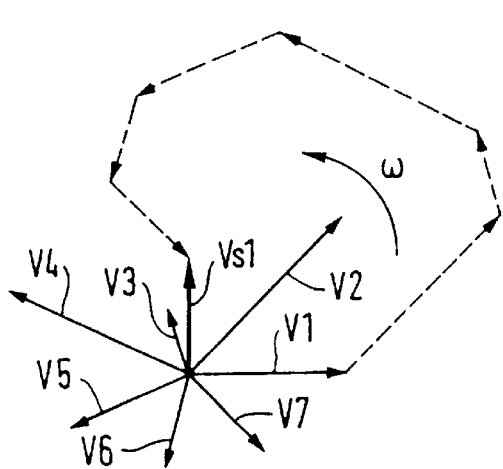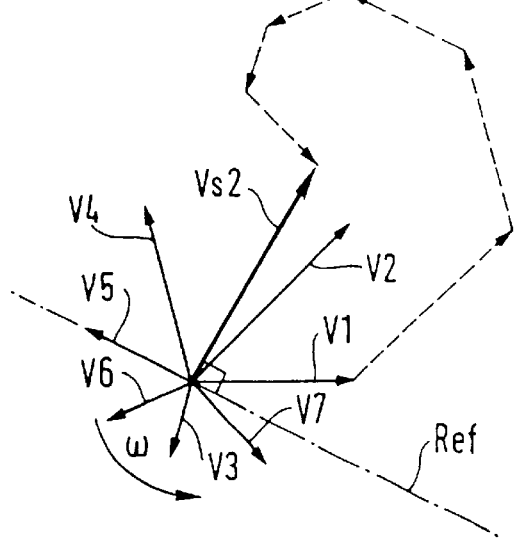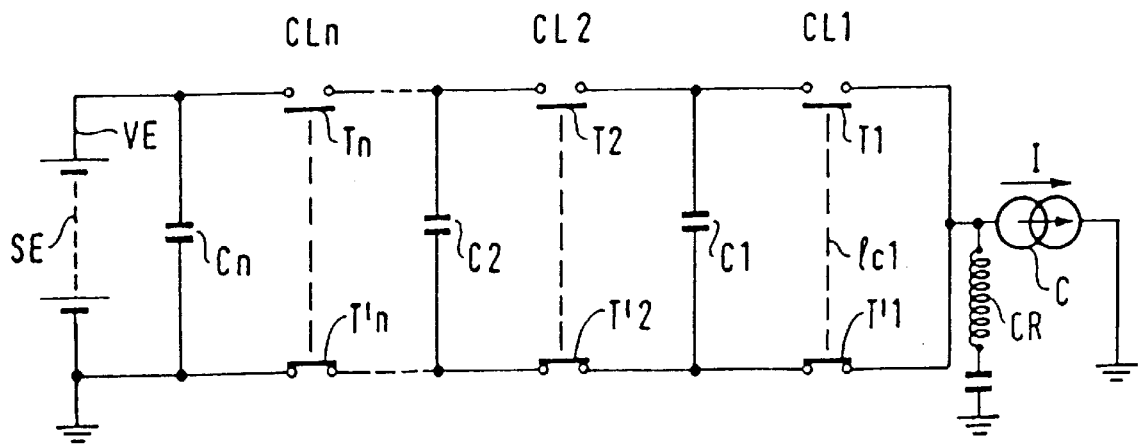

ELECTRICAL CIRCUIT FOR CONVERTING ELECTRICAL ENERGY HAVING CAPACITORS AND CONTROLLER FOR MAINTAINING A NOMINAL CHARGE ON EACH CAPACITOR

The present invention relates to electronic circuits for converting electrical energy of the type described in French patent application FR 2 679 715 A1, and to a power supply installation making use thereof.

BACKGROUND OF THE INVENTION

The converter described in that patent application is shown, by way of example, in accompanying FIG. 1. It essentially comprises, between a voltage source SE and a current source C, a succession of controllable switching cells CL1, CL2, ..., CLn, each having two switches T1, T'1; T2, T'2; ...; Tn, T'n, with one pole of each of the two switches forming part of a pair of upstream poles and the other pole of each of the switches forming part of a pair of downstream poles, the pair of downstream poles of an upstream cell being connected to the pair of upstream poles of a downstream cell, and the pair of upstream poles of a first cell CL1 being connected to said current source C, while the pair of downstream poles of a last cell CLn is connected to said voltage source SE, the converter also comprising a respective capacitor C1, C2, ..., Cn for each cell, except that the capacitor of the last cell may be omitted when said voltage source SE is suitable for performing the same role, each capacitor being connected between the two poles constituting the pair of downstream poles of its cell, the converter further having control means (not shown) governing the nominal operation of the converter and acting on the switches of the successive cells in such a manner that the two switches of any one cell are always in respective opposite conduction states (represented by control links such as lc1), such that in response to a cell control signal delivered by said control means, one of the two switches in a given cell is successively in a first conduction state and then in a second conduction state during a cyclically repeated converter chopper period, and such that in response to cell control signals that are identical but offset in time by a fraction of said converter chopper period, the switches of successive cells function respectively in the same manner but offset in time by said fraction of a period.

Preferably, said fraction of a period is equal to the reciprocal of the number n of cells, i.e. $2\pi/n$, which is optimal with respect to harmonics generated on the output and which enables the voltages charged on the capacitors of the converter to be balanced naturally. Some other offset is nevertheless conceivable, as are different offsets between the various stages.

In such a converter, the successive capacitors C1, C2, ..., Cn have respective increasing mean charge voltages, the mean charge voltage of the capacitor associated with each of said cells being equal to the product of a voltage VE delivered by said voltage source SE multiplied by the reciprocal of the number of cells in the converter and by the rank of the cell, i.e. VE/3, 2VE/3, VE when n=3, i.e. when the converter has only three cells.

Naturally, the above applies to other values of n, providing n is not less than two, and in particular when n is greater than three.

The term "multilevel converter" is used below to designate a converter that satisfies the above description.

An object of the present invention is to make provision in such a multilevel converter for the charge on each capacitor to remain in compliance with the above description, in spite of inevitable departures from nominal operating conditions.

To examine more easily how the charge ought nominally to vary on one of the capacitors of a multilevel converter as described above, reference is made to FIG. 2 which shows an arbitrary switching cell CLk together with its switches Tk and T'k, the capacitor Ck associated with the cell, and also the following cell CLk+1 and its switches Tk+1, T'k+1.

Given the coupling between the switches within each cell, Tk and T'k or Tk+1 and T'k+1, the set of two imbricated cells CLk and CLk+1 shown in FIG. 2 has four states:

a) a first state where Tk and Tk+1 are non-conducting, so the charge voltage on Ck does not change;

b) a second state where Tk and Tk+1 are both conducting, so the charge voltage on Ck does not change either, since under those circumstances T'k and T'k+1 are non-conducting;

c) a third state where Tk is conducting and Tk+1 is non-conducting, in which case the current source C forces a current Ik which is equal to I to flow through Tk while the current I'k through T'k is zero. It is the state of Tk+1 that forces the current Ik+1 to be zero, while the current I'k+1 is equal to I so the current I'ck through the capacitor Ck is equal to I; and d) a fourth state where Tk is non-conducting and Tk+1 is conducting, so the current source C forces a current I'k+1 equal to I through T'k while the current Ik through Tk is zero. The state of Tk+1 forces a current Ik+1 to be equal to I, while the current I'k+1 is zero, so the current Ick through the capacitor Ck is equal to I.

The currents I'ck=I'k+1 and Ick=Ik+1 deliver additional charge of opposite signs to the capacitor Ck in the above third and fourth states; the first situation is said to be negative and the second positive. The currents corresponding to these two states are forced by the current source. If the current source forces an exactly accurate DC, and everything else remains equal, then the currents forced by the current source during stages c) and d) are the same and in opposite directions at all times throughout the conduction periods of Tk and Tk+1 (which are nominally equal and offset in time, as mentioned above). This means that the charge on Ck is changed negatively and then positively by equal amounts, so it does not vary over one chopper period of the converter.

In an ideal system (accurate current source, infinite impedance), the currents Ick and I'ck are determined by the current source. In more practical terms, when the impedance of the current source is not infinite, the current through the current source depends on the voltage across its terminals and thus on the voltages Vck on the capacitors. For example, if it should happen that the charge voltage Vck is too high compared with its nominal value VE.k/n, for whatever reason, then there will result a discharging current I'ck tending to be greater and a charging current Ick tending to be smaller than they ought to be nominally, thereby tending to return the charge on the capacitor Ck to the value it ought to have. This explains that the operation of the multilevel converter is stable and can accommodate variations in amplitude, in either direction, both at the voltage source and at the current source. It is explained below that this nevertheless gives rise to problems in dynamic terms.

FIG. 3 is an example of operation of the multilevel converter of FIGS. 1 and 2 for a situation when n=3; pulse width modulation (PWM) type control is applied in order to deliver a sinusoidally modulated alternating voltage to the current source C, i.e., during successive periods p1, p2, p3, ... in the operation of the converter (line t), the switches T1, T2, and T3 are successively conductive during time intervals that vary in accordance with a wave for modulating the output voltage, referred to below as the "modulating" wave. At each instant, the corresponding switches T'1, T'2, and T'3 are in the opposite positions.

Naturally, other modes of modulating the operation of the switches make it possible to obtain the same result, as is well known. Also clearly, the converter may also serve to deliver the current source C with any other waveform or with a regulated DC voltage.

Consideration is given initially to the period p1 in the operation of the converter. During this period, while any one of the switches T1, T2, and T3 is conducting, the other two are non-conducting. For each set of two cells and the capacitor between them, this corresponds to above-described states c) and d), in which the capacitor receives successive additional negative and positive charge, with the total value thereof being nominally zero. It should also be observed that while the imbricated cells CL1 and CL2 are in state d), adjacent cells CL2 and CL3 are in state c) such that capacitor C1 receives additional positive charge from the same current that provides additional negative charge to capacitor C2.

FIG. 3 also shows, by way of example, how the multilevel converter operates during periods p2, p3, etc . . . , during which the conduction periods of the switches T1, T2, and T3 become shorter, and then become longer until they exceed one-third of a period, in which case they overlap. Line VI shows the voltage that would ideally be transmitted to the current source, in particular if the capacitance of the capacitors was such that the additional charge in question did not significantly alter the voltage across their terminals. The voltage VI is expressed in fractions of the voltage VE from the voltage source SE, taking the negative pole of the voltage source SE as the voltage reference. It can then be seen that this voltage VI contains both a large fundamental at the frequency of the modulating wave, and also lower-amplitude harmonics at frequencies higher than the chopper frequency, or converter operating frequency, which are easily eliminated by a low-pass filter. Since the current is variable, integrating it by means of an arbitrary inductive element contained in the current source results in the converter supplying the current source with an AC of sinusoidal appearance having a period that is equal to the period of the fundamental of the output voltage.

Since the current varies sinusoidally, states c) and d) mentioned above will not convey equal additional amounts of charge to the capacitors of the converter, since between the above two states, the current will have had time to vary. Such variation is negligible only if the operating period of the switches is significantly greater than the frequency of the modulating wave.

It should also be expected that the AC supplied to the current source will not be exactly sinusoidal, but will be distorted in an asymmetrical manner. Likewise, errors in the levels of the control signals or in the signals they generate, or indeed differences in the switching times of the various switches involved, inevitably cause switch conduction durations to be unequal over an operating period of the converter, or will shift the conduction stages of the switches in time, or else will unbalance the currents charging and discharging the capacitors. Consequently, and in general, it is not possible in practice with a multilevel converter of the type described to guarantee that nominal operating conditions as described initially will, in fact be satisfied. Unfortunately, a persistent error in additional charge will lead to an error in one direction or the other in the charge on a capacitor, and thus to an error in its mean charge voltage, thereby giving rise to distortion at the operating frequency of the converter in the voltage delivered to the current source.

This effect is illustrated by trace VI' in FIG. 3 which is similar to the trace VI with the exception that capacitor C1 (FIG. 1) which is assumed to be charged to a voltage that is smaller than its nominal charge voltage prevents the converter from delivering pulses vi1, vi2, vi3 of constant amplitude, with the converter supplying instead, pulses such as vi1' that are of smaller amplitude (the scale is exaggerated to make it more readable) whenever the capacitor C1 is delivering its own charge voltage to the current source C, and pulses such as vi2' of greater amplitude whenever the capacitor C1 is subtracting its own voltage from the voltage delivered to the current source C, and finally also pulses such vi3' of unchanged amplitude whenever the capacitor C1 is not in the circuit. It is thus easy to see that this introduces into the signal VI' a disturbing component at said chopper frequency of the converter.

Such a disturbing component does not exist when the capacitors are charged to their respective nominal voltages. When such a component appears, it is generally harmful.

However, and above all, the voltages to which the switches are subjected are no longer substantially equal to the differences between the nominal charge voltages of two adjacent capacitors, i.e. the voltage of the voltage source divided by the number of stages in the converter. This can put the switches in danger.

Naturally, and as mentioned above, charge differences on the capacitors tend spontaneously to be reabsorbed, but that process takes time.

In addition, the spontaneous process is implemented via the current source. It is therefore slowed down whenever the current flowing through the current source is small.

OBJECTS AND SUMMARY OF THE INVENTION

On the basis of the above observations, the present invention proposes a multilevel converter in which the mean charge on each capacitor of the converter is better maintained at its nominal value.

With reference to the definition of a multilevel converter given at the beginning of this text, it should be emphasized that under nominal converter operating conditions provision is made for each the various stages of the converter to perform the same operating cycle, in a chopper period of the converter or "chopper period", but offset in time by a fraction of said period, which fraction is preferably equal to $2\pi/n$, where $2\pi$ represents the chopper period of the converter, and n is the number of stages. With reference to FIG. 3, it can be seen that, during a chopper period of the converter (p1, p2, p3, . . . ), the stages of the converter produce equal voltage steps (vi1, vi2, vi3), the sum of which supplies a constant value. In other words, the output signal is sampled on the basis of the chopper period of the converter, divided by the number of stages.

When the switches used are implemented by means of relatively slow high-power components, such as GTO thyristors, the chopper period of the converter is relatively long, and it therefore introduces a time constant that is relatively long into the response to any sudden command to change the operating mark-space ratio of the converter. In which case, the present invention also makes it possible to reduce such a time constant.

According to the invention, the multilevel converter includes additional control means organized to change, on command, the time position of said first conduction state of one or more cells.

In a first embodiment of the invention, said change in the time position of said first conduction state of one or more cells is effected by advancing or retarding said first conduction state, without changing the operating order of the cells of the converter.

By changing the time position of said first conduction state of one or more cells, such a configuration makes it possible to cause a variation in the voltage applied to said current source, i.e. a variation in the energy transferred to the current source, but also to induce a corresponding variation in the current through the current source, and therefore a variation in the charge on the capacitor(s) affected by said variation in current.

In a second embodiment of the invention, said change in the time position of the said first conduction state of one or more cells includes a change in the operating order of the cells of the converter during a chopper period of the converter, aimed at grouping together operation of the stages of the converter that manifest same-direction charge differences.

Such a change causes an overall disturbing component to appear in which the same-direction differences are reinforced, and this increases the effectiveness of the process of spontaneous resorption of the charge differences of the capacitors of the converter.

According to an additional characteristic of the invention, a re-balancing load is connected in parallel on said current source, in the form of a series impedance tuned to the chopper frequency of the converter, so as to increase the current resulting from said overall disturbing component.

The multilevel converter preferably includes difference-measuring means for measuring, for each of said capacitors, any difference between the evaluated mean charge voltage and the nominal mean charge voltage of the capacitor, as well as additional control means for changing the time position of said first conduction state of one or more cells of the converter in a direction such that said measured difference is reduced.

In a variant of said first embodiment of the invention, the multilevel converter includes difference-measuring means for measuring, for one of said capacitors, any difference between the evaluated means charge voltage and the nominal mean charge voltage of the capacitor, as well as an additional control circuit for changing the time position of said first conduction state of the cell of the converter containing the capacitor in a direction such that said measured difference is reduced.

In this variant, each of the difference-measuring means includes means for receiving the value of the voltage of the voltage source, the rank of the stage and the number of stages so as to determine what the nominal charge voltage of each capacitor consequently ought to be in an operating period of the converter, said difference then being measured on each capacitor of the converter by comparator means subtracting said mean voltage evaluated across the terminals of each capacitor from said nominal charge voltage of the capacitor.

Advantageously, said evaluated mean voltage across a capacitor is supplied by evaluation means comprising a voltmeter network connected across the two terminals of the capacitor.

In a variant, said evaluated mean voltage across a capacitor is supplied by evaluation means comprising a voltmeter network connected across the two terminals of a switch in the cell containing the capacitor.

In another variant, said means for evaluating the voltage across the terminals of each capacitor comprise a voltmeter network connected across the two terminals of the current source.

Preferably, each of said additional control means receives, in addition to said difference signal, a measurement of the current forced by said current source and a constant expressing the capacitance of one of said capacitors that is associated with it, and computes accordingly a change in the time position of said first conduction state of the cell associated with the capacitor, which change is such that it generates additional charge in the capacitor compensating for said charge difference.

Also preferably, each of said additional control means also receives a modulating signal, and changes accordingly the duration of said first conduction state of the cell associated with the capacitor, so that, with all of said additional control means acting likewise, said current source receives a mean voltage modulated according to said modulating signal.

Also preferably, each of said additional control means receives from an adjacent additional control means a change signal established therein and defining a change that the adjacent additional control means makes to said time position of said first conduction state of the cell associated with it, so that the additional control means in question changes accordingly said time position of said first conduction state of the cell specific to it, in a direction that compensates, in the capacitor associated with that cell, the effect of said change made in the adjacent cell.

Furthermore, in addition to receiving said difference signal, each of said additional control means receives a measurement of the current forced by said current source and a constant expressing the capacitance of an associated one of said capacitors, as well as a converter mark-space ratio variation command, and it computes accordingly a change in the time position of said first conduction state of the cell associated with the capacitor, the change being such that it generates, across the terminals of said current source, a mean voltage variation that satisfies said command.

BRIEF DESCRIPTION OF THE DRAWINGS

The various objects and characteristics of the present invention appear more clearly in the following description of embodiments of the invention given by way of non-limiting example and made with reference to the accompanying figures, in which:

FIG. 5 shows curves illustrating how the invention is implemented in accordance with the configuration of FIG. 4, and relating to an arbitrary multilevel converter cell, such as the cell shown in FIG. 2, in an application to maintaining the mean charge of the capacitors of the converter;

FIG. 6 is the circuit diagram of means for evaluating capacitor charge voltage, which means are usable in the circuit of FIG. 4;

FIG. 7 is the circuit diagram of a variant of a portion of the means shown in FIG. 4, corresponding to the case when the mean charge voltage of each of the capacitors of the multilevel converter is derived from knowing the voltage across the terminals of each of the switches, when they are open;

FIG. 8 shows curves, similar to the FIG. 5 curves, illustrating how the invention is implemented in accordance with the configuration of FIG. 4, and relating to an arbitrary multilevel converter cell, such as the cell shown in FIG. 2, in an application to reducing the time constant of the converter;

FIG. 10, similar to FIG. 5, shows the pulses that are produced by the stages of a 7-stage converter when, over a chopper period of the converter, unequal charges on the capacitors produce an output voltage ripple of frequency that is twice the chopper frequency of the converter;

FIG. 11 is similar to FIG. 10, but, by rearranging operation of the various stages, the frequency of the ripple produced by the same unequal charges on the capacitors is equal to the chopper frequency of the converter;

FIG. 12 is a vector diagram of the converter operating mode illustrated in FIG. 10, showing that the resulting voltage at the chopper frequency of the converter is of relatively small amplitude;

FIG. 13 is a vector diagram of the converter operating mode illustrated in FIG. 11, showing that, by re-arranging the operating sequence of the stages of the converter, the resulting voltage at the chopper frequency of the converter is of relatively large amplitude; and FIG. 14 is the circuit diagram of the FIG. 1 converter to which a tuned load CR is added to contribute to re-balancing the voltages across the capacitors of the converter when it is operating as illustrated in FIG. 13.

MORE DETAILED DESCRIPTION

A multilevel converter is not described again. The diagrams of FIGS. 1, 2, and 3 correspond to a converter of the type described in patent document FR 2 697 715 A1, to which the reader can refer for more ample details.

Figure 1:
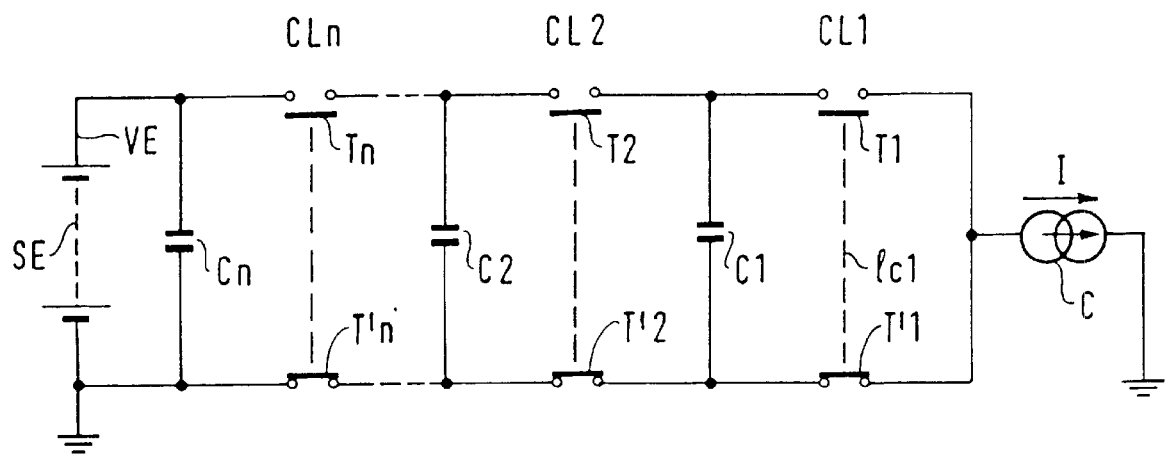
FIG. 1, described above, is the circuit diagram of a known multilevel converter.
Figure 2:
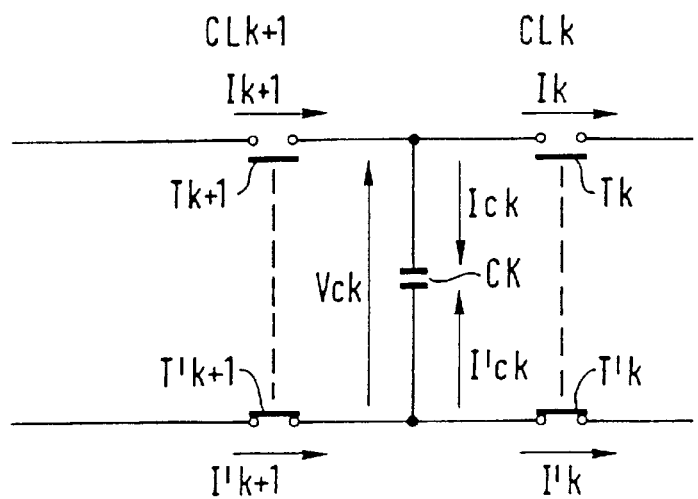
FIG. 2, described above, is the circuit diagram of a set of two imbricated stages of the multilevel converter of FIG. 1.
Figure 4:
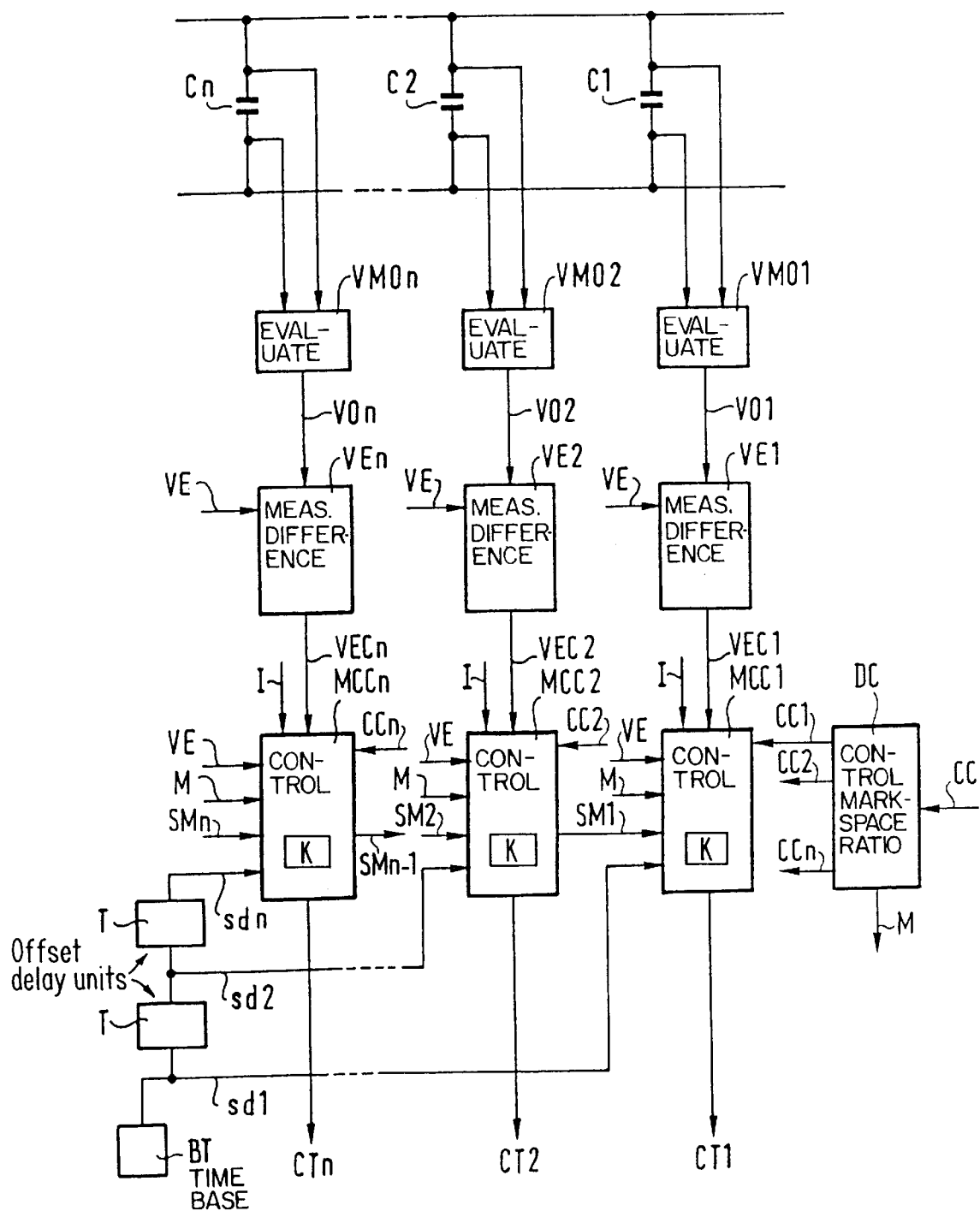
FIG. 4 is the circuit diagram of control means for a multilevel converter of the type shown in FIGS. 1, 2, and 3, which control means are organized to enable the invention to be implemented.

In FIG. 4, only the capacitors C1, C2, . . . , Cn of the FIG. 1 converter are shown.

According to the invention, each of these capacitors is associated with a respective evaluation circuit VMO1, VMO2, . . . , VMOn containing means enabling the mean charge voltage across each of the capacitors to be evaluated. To this end, each such circuit is coupled to the two terminals of a respective capacitor, and it provides an evaluation signal VO1, VO2, . . . , VOn representative of the mean charge voltage that exists across the terminals of the capacitor.

According to the invention, each of the capacitors is also associated with a respective difference-measuring circuit VE1, VE2, . . . , VEn measuring the difference, if any, between the observed mean charge voltage as received from the corresponding evaluation circuit and the nominal mean charge voltage of the capacitor. The difference-measuring circuit itself calculates the nominal mean charge voltage of the capacitor, which is the fraction 1/n of the voltage VE of the voltage source SE multiplied by the rank R of the stage, n being the number of stages in the converter. This circuit thus receives the value VE, while the values n and R, which are constant, are hard-wired in each circuit. The circuit derives therefrom the nominal mean charge voltage VE.R/n and compares it with the evaluated mean charge voltage to provide a difference signal VEC1, VEC2, . . . , VECn representative of the difference between said two voltages.

The difference signal acts on additional control means included in control modules MCC1, MCC2, . . . , MCCn. These control modules operate in response to trigger signals sd1, sd2, . . . , sdn which are delivered to them on each period such as p1 (FIG. 3) by a time base BT in offset manner so as to control the switching cells of the converter in offset manner. The primary function of each of the control modules is to produce a control pulse during each period, the nominal duration of the control pulse being determined by the value of the modulating signal or modulating wave M output by a mark-space ratio control circuit DC. They thus produce control pulses CT1, CT2, . . . , CTn whose widths are modulated as shown by lines T1, T2, and T3 in FIG. 3. Each of said additional means in the control modules MCC1, MCC2, . . . , MCCn also changes the time position of the pulse as a function of the value of the difference signal VEC1, VEC2, . . . , VECn, and of the current I forced by the current source. Each of said additional means in the control modules MCC1, MCC2, . . . , MCCn also preferably changes the time position of the pulse as a function of the change made to its own control pulse by an adjacent control module and indicated to it by a change signal SM1, SM2, . . . , SMn produced by each control module MCC1, MCC2, . . . , MCCn. In the example shown in FIG. 4, the signal SM1 is produced by the control module MCC2, and the signal SM2 is produced by a module MCC3 (not shown). Signal SMn is mentioned for reasons of uniformity for control module MCCn, but it does not exist insofar as there is no control module MCCn+1. Each of said additional means in the control modules MCC1, MCC2, . . . , MCCn finally changes the time position of the pulse as a function of the mark-space ratio control signal CC1, CC2, . . . , CCn output by the above-mentioned mark-space ratio control circuit DC, which is itself subject to a mark-space ratio command CC. This aspect will be discussed at the end of the present description. The resulting signals CT1, CT2, . . . , CTn control the states of the switches in the corresponding switching cells CL1, CL2, . . . , CLn.

More precisely, the difference signal retards (or advances) the "1" states of the corresponding switch T1, T2, . . . , Tn (see FIG. 1), relative to a nominal position defined on the basis of the trigger signal sd1, sd2, sdn. Still more precisely, in this first embodiment of the invention, such a change in time position of operation of stages of the converter takes place without changing the order in which the stages of the converter operate successively. Such change in the time position of the control pulse of the switch depends on the charge difference to be corrected, but also on the current through the current source I, as measured by a conventional-type current sensor inserted in series with the current source, and on the capacitance of the capacitor, which is a constant hard-wired in the additional control module, e.g. as shown at "K" in FIG. 4.

It also depends on the time position conferred on the adjacent control pulse, as explained above, namely that "capacitor C1 receives additional positive charge from the same current that provides additional negative charge to capacitor C2". Thus, for example, advancing the control pulse CT2, which puts the switch T2 in the conducting state and which charges the capacitor C1 positively and the capacitor C2 negatively, applies desirable additional negative charge to the capacitor C2, as well as undesirable additional positive charge to the capacitor C1. This advance is therefore indicated to the control module MCC1 by the signal SM1 which is used to correct the time position of the control signal CT1 in a direction such that the above-mentioned undesirable additional positive charge is corrected (before it occurs).

Naturally, the directions of such step-by-step corrections are reversed if the influence of charge variations that one capacitor has on the other occurs in the other direction.

FIG. 5 shows how the dispositions described above act. As in the operating example shown in FIG. 3, the voltage applied by the converter to the current source is shown, referenced VS, and the cyclically repeated converter periods pc1, pc2, . . . , can be seen, each of which contains three pulses ic1, ic2, ic3, each of which comes from a respective one of the stages of a three-stage converter, and is delimited by a corresponding control pulse. The current through the current source and therefore through the stages of the converter is referenced CC. In this example, consideration is given to an inductive current source through which the current varies, admittedly slowly, because of the voltage applied to the current source. Naturally, these variations are amplified in the figure to make it more readable.

In the left portion of the figure, which covers the chopper period of the converter pc1, the pulses ic1, ic2, and ic3 are situated respectively at the very beginning, at the first third, and at the second third of the period, corresponding to their respective nominal positions. In the operating example considered, in which the pulses are short and do not overlap, the amplitude of each of the pulses, as seen at the terminals of the current source, e.g. from the output of the converter, is equal to VE/3. The mean voltage delivered, represented by a dashed line, is thus equal to vm. The current ci through the current source increases during the pulses of the output voltage and decreases between them, its mean value cms, represented by a dashed line, remaining constant.

In the right portion of FIG. 5, which covers the chopper period of the converter pc2, although the first pulse ic1 and the third pulse ic3 have retained their respective nominal positions, the pulse ic2 has been advanced relative to its nominal position. As a result, the mean value of the output voltage shows a temporary increase indicated at acm. Likewise, the current ci shows a temporary increase acm.

During the time for which the switch T2 (see FIG. 1) conducts, this temporary increase in current increases the charge on the capacitor C1 and decreases the charge on the capacitor C2, relative to what the current ci would produce when maintained at its mean value cms. Such action thus makes it possible to reduce the charge on the capacitor C2, which charge is assumed to be excessive.

Under the operating conditions considered in this example, this action is thus caused by a non-zero difference signal VEC2. The control module MCC2 offsets accordingly the control pulse CT2 so as to cause the pulse ic2 of the period pc2 to be displaced as indicated in the figure. The displacement in question is of direction and of amplitude such that it substantially reduces or even cancels completely the charge difference that causes it.

This action also results in a corresponding increase in the charge on the capacitor C1. This requires corrective action to be taken relative to that capacitor, by offsetting the control pulse of the switch T1. Such corrective action could take place during a subsequent operating period of the converter. In a preferred embodiment it is taken in the same chopper period of the converter because each control module receives, from the adjacent module, a correction signal SM1, SM2, . . . , SMn representative of the correction made by said adjacent module, and enabling the module that precedes it to make provision for applying an opposite correction serving to counter-balance it.

Figure 3:
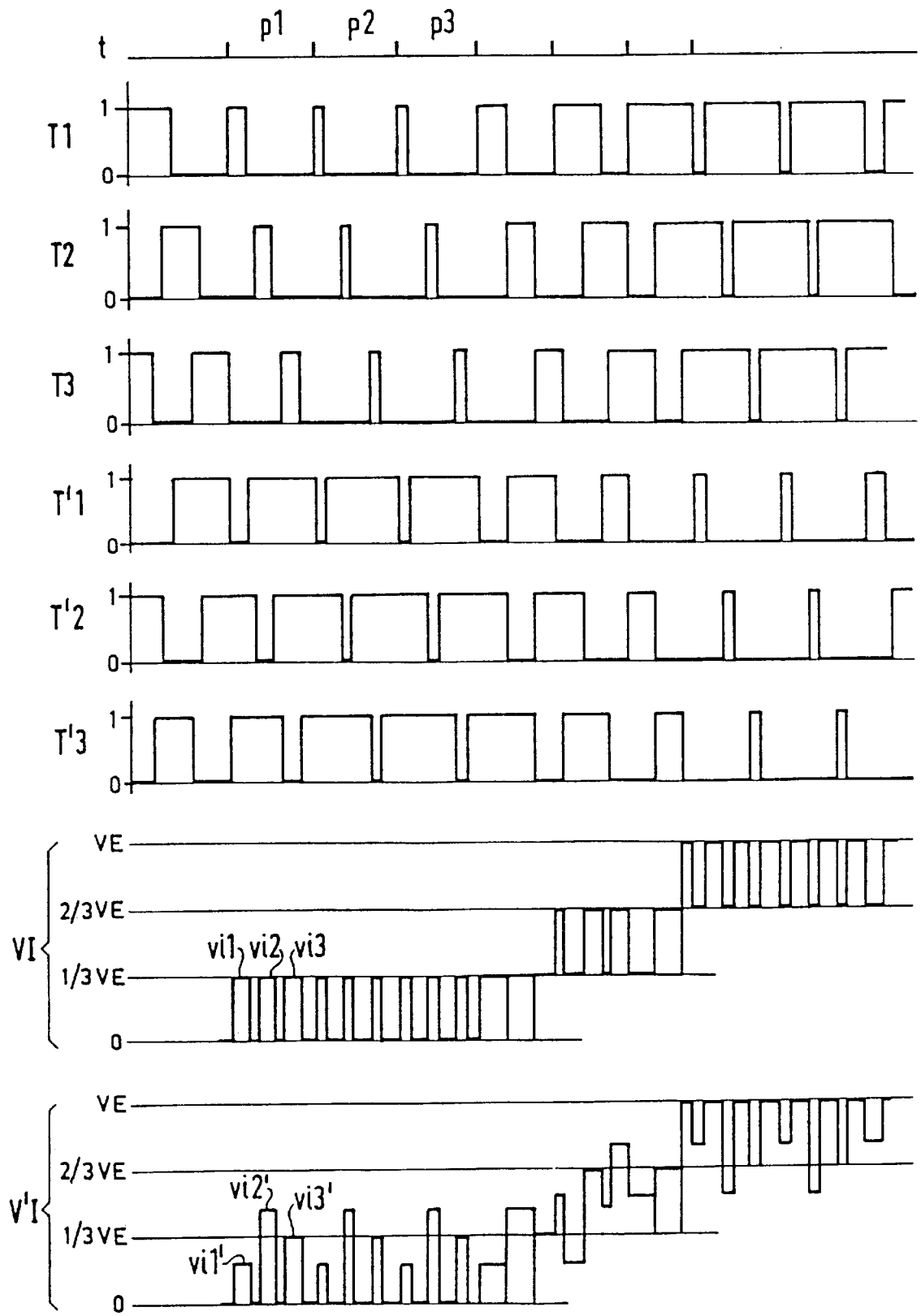
FIG. 3, described above, is a waveform diagram showing operation of the multilevel converter of FIGS. 1 and 2, for the case where it comprises three stages.

Naturally, the above example illustrated by FIG. 5 and described for the case when control pulses or voltage pulses supplied by the converter are relatively short, and are separated from one another, applies equally well to the case of long pulses such as those shown in the right of FIG. 3.

Figure 9:
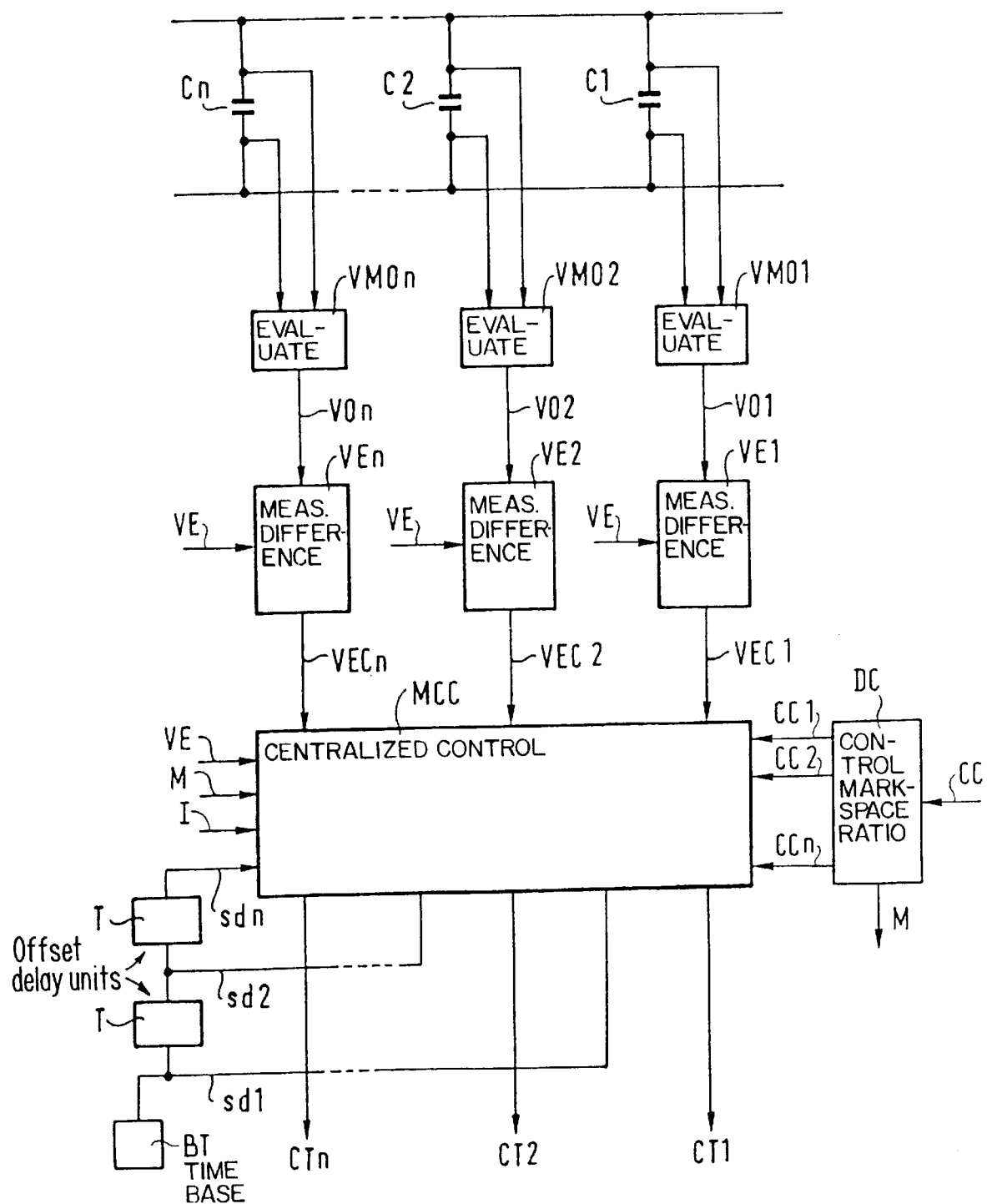
FIG. 9, similar to FIG. 4, is the circuit diagram of control means for a multilevel converter of the type shown in FIGS. 1, 2, and 3, which control means are organized to enable the invention to be implemented, and they incorporate a centralized control circuit.

Furthermore, in a variant, the capacitor charge differences in question may be corrected in a centralized control circuit performing the functions of all of the control modules MCC1, MCC2, . . . , MCCn. Such a centralized control circuit MCC is shown in FIG. 9 which is otherwise identical to FIG. 4. In a variant, a circuit may be provided that contains all of the control modules MCC1, MCC2, . . . , MCCn, together with interconnections and inter-module co-ordination means, and that is thus capable of computing the initial correction(s) to be made to the operation of one or more stages of the converter, as well as the corresponding subsequent corrections.

In a simple embodiment, such a circuit maintains the time position of the control pulse of the first stage of switches, for example, corrects any observed difference by changing the time positions of the control pulses of the other stages, as explained above. It is equally conceivable to maintain the nominal position of the control pulse of the last stage.

Under these conditions, a person skilled in the art can easily understand that, by making an overall correction affecting all of the stages except for one, it is possible, using the mechanism described above, to adjust the last command so that the entire set of corrections has no effect on the current source, the voltage supplied to the current source remaining constant, and only the energy taken from the voltage source being changed, by increasing or reducing the energy taken, and then distributing it over the various stages by means of the above-described correction mechanism.

The above-described circuit thus makes it possible to modulate the time positions of the control pulses of the switches Tk so that, at all times, the mean voltage of each capacitor Ck is as close as possible to its nominal charge voltage.

As described above, the nominal charge voltage corresponds to a fraction of the voltage VE of the voltage source (cf FIG. 1) which depends on the rank k of the stage in question.

The mean charge voltage of the capacitor is therefore evaluated in a manner consistent with the above, in an observation circuit VMO1, VMO2, . . . , VMOn, i.e. VMOk in general terms.

Based on the above, and with reference to FIG. 6, the observation circuit is constituted, in one embodiment, by impedances ptk1 and ptk2 connected in series across the terminals of the capacitor Ck, and delivering a determined fraction of the voltage across the terminals of the capacitor to an analog-to-digital converter ADC which functions on each pulse fk to deliver a digital voltage value to an averaging circuit SCk which is read once per converter cycle by a gate circuit PVk which is triggered by a signal gk. The signals fk and gk are advantageously produced by a time base BT (FIG. 4) and their positions in the operating period of the converter are such that after m measurements of the voltage in the operating period of the converter, and after computation of the mean of the results of said measurement, the value for the observed mean charge voltage is made available on the output VOk of the circuit SCk, once per converter cycle, at the moment appropriate for determining, in the control modules MMC1, MMC2, . . . , MMCn, the change described with reference to FIG. 4 in the time position of the appropriate conduction state (conduction of the switch Tk in the above) of the corresponding cell.

Naturally, the observed mean charge on the capacitor Ck may be obtained by other means.

In a first variant, shown in FIG. 7, instead of measuring the voltage across the terminals of the capacitor Ck, the voltage VE of the voltage source is measured as is the voltage across the terminals of one of the switches in each cell, so as to establish, by subtraction, and step-by-step, the mean charge voltage of each of the capacitors of the multilevel converter. FIG. 7 shows one of the switches Tk of the FIG. 1 multilevel converter, to which switch a voltage evaluation circuit VIk is coupled. The voltage evaluation circuit may be as shown in FIG. 6, subject to being adapted by a person skilled in the art, and it supplies a signal Vk representative of the voltage across the terminals of the switch Tk to a computation circuit CC at the same time as the computation circuit receives the control signal VCk controlling the switch Tk, which makes it possible for the computation circuit to taken into consideration only the values supplied by the evaluation circuit VIk during the periods in which the switch is not conducting. The computation circuit receives the voltage VE directly, which voltage may also be obtained by a circuit such as the FIG. 6 circuit, appropriately simplified, and it effects the subtraction that supplies the signals VO1, VO2, . . . , VOn of FIG. 4.

In another variant, which can be deduced easily from FIG. 3, the amplitude measurement of the pulses delivered to the current source I represents the voltage across the terminals of the capacitor that generated them. A single circuit such as the FIG. 6 circuit connected to the terminals of the current source C, and evaluating the voltage at different points along the curve VI of FIG. 3, during each period, such as p1, sees the levels vi1, vi2, vi3 output by each of the capacitors. A person skilled in the art can easily understand how it is possible to derive therefrom the signals VO1, VO2, . . . , VOn shown in FIG. 3 representing the evaluated mean charge of each of the capacitors of the multilevel converter.

It remains to return to the description of FIG. 4, and in particular to the mark-space ratio control circuit DC which responds to a mark-space ratio command CC by delivering mark-space ratio control signals CC1, CC2, . . . , CCN which changes the time positions of the control pulses CT1, CT2, . . . , CTn in the respective control modules MCC1, MCC2, . . . , MCCn.

It is explained above, with reference to FIG. 3, that the converter of the invention may respond to a modulating wave M by delivering an output voltage of sinusoidal appearance to the current source. Naturally, the converter of the invention may deliver an output voltage of different appearance, within certain limits however. As explained in the description relating to FIG. 3, under nominal converter operating conditions, converter chopper periods are provided during each of which each of the various stages of the converter produces a pulse, all of the pulses of the stages being equidistant and of the same length. The mechanism described with reference to FIG. 5 for regulating the charge on the capacitors of the converter acts on the positions of the pulses. Ignoring this mechanism, whose effect on the positions of the pulses should generally be moderate, because the drift of the charge on the capacitors should in practice be slow, and because it makes it possible to respond rapidly to such drift, it can be seen that the response of the converter to a mark-space ratio change command takes place late, by taking into account a new value of the modulating wave M at the beginning of the following chopper period of the converter. This is desirable because a change of mark-space ratio during a period, e.g. considerably lengthening the pulse vi2 in FIG. 3, would immediately unbalance the charge on the capacitors, which could be detrimental to the switches.

The invention thus also makes it possible to respond to a mark-space ratio change command without waiting for the beginning of the following chopper period of the converter, i.e. more rapidly than when operating as described above, as is explained below with reference to FIG. 8.

FIG. 8 shows a converter chopper period pc3 which is identical in every way to the converter chopper period pc1 shown in FIG. 5, and which is followed by a converter chopper period pc4 which starts like the converter chopper period pc2 in FIG. 5 with a pulse ic1 in its nominal position, the mark-space ratio control signal CC1 delivered by the mark-space ratio control circuit DC being inactive. However, following a sudden change in the mark-space ratio command CC, the mark-space ratio control circuit not only changes the modulating wave M, but it also makes the signals CC2, . . . , CCn active, i.e. the signals CC2 and CC3 in the operating example given in FIG. 8. In the example illustrated by this figure, the signals CC2 and CC3 and operation of the control modules MMC1 to MMCn are such that they advance the pulses ic2 and ic3 delivered to the load by the same duration. In which case, the control modules do not take into account the correction signals SM1, SM2, . . . , SMn.

The effect produced is illustrated by FIG. 8. The mean voltage delivered at the output of the converter undergoes a temporary increase vmc due to the pulses ic1 and ic2 moving closer together, followed by a temporary decrease at the end of the period, just before the change in the value of the modulating wave causes a lasting increase in said mean voltage. The mean current undergoes an increase acs, before it settles lastingly at an increased value. Overall, the voltage and the current in the load increase as of the period pc4, i.e. without waiting for the following chopper period of the converter. This achieves the desired saving in the response time for responding to a mark-space ratio change command.

Naturally, the above example can accommodate numerous variants. The control circuit DC may contain programs of various levels of complexity for responding to mark-space ratio change commands. For example, each waveform of the mark-space ratio command may correspond to appropriate displacements of the remaining control pulses in the chopper period of the converter. When the converter powers an actuator, with the voltage and the current output by the converter procuring a drive pair, the response of the mark-space ratio control circuit DC must take into account the characteristics of the actuator so as to provide it with an electrical power supply enabling the mark-space ratio change command to be satisfied as well as possible.

A second embodiment of the invention is described below with reference to FIGS. 10 to 13. As is explained in more detail, changing the time position of said first conduction state of one or more cells is not limited to advancing or retarding said first conduction state, without changing the operating order of the cells of the converter. The operating order of the cells of the converter is changed to facilitate spontaneously re-balancing the charge voltages across the capacitors. It should be understood that this measure may either replace or supplement the measure consisting in changing the time positions of operation of the stages of the converter without changing the order thereof.

With differences that are highly exaggerated to make it easier to understand the phenomenon, FIG. 10 shows the pulses IC1 to IC7 output by the successive stages of a 7-stage converter when the pulses are produced by the stages of the converter operating in numerical order, as in the above-described operating examples, and, simultaneously, the impulses are modulated by differences in the charges on the capacitors of the successive stages. As explained above, the output voltage Vs, of the converter, is the sum of the pulses uniformly offset over time. If they were all equal, the output voltage Vs would be constant. In this respect, FIG. 10 shows an example in which, during the converter chopper period pce, modulation takes place at twice the operating frequency of the converter (referred to as "fc", and which is the reciprocal of the period pce). Naturally, this modulation may take many other forms and generate harmonics at frequencies that are multiples of the converter chopper frequency fc. More generally, analysis by Fourier series development of the sum of the voltage pulses output by the various stages shows that a sum of vectors is present having angular frequencies that are multiples of the angular frequency of the converter, as shown in FIG. 12 which relates to the first multiple, i.e. the multiple that corresponds to fc. The sum of the vectors Vs1 is of relatively small amplitude, which represents that fact that erratic voltage differences tend to compensate for one another at the frequency fc.

FIG. 10 shows the voltage across the terminals of the low switches of the converter, which voltage is equal to E/7 at the nominal point, i.e. a seventh of the voltage E powering the converter, and a voltage RE which is the mean voltage Vs, for pulses of the duration shown, if all of the pulses had the amplitude E/7.

In parallel, FIG. 11 shows the FIG. 10 pulses whose order is changed by a re-arrangement aimed at grouping together operation of the stages of the converter that show same-direction charge differences. The effect, as shown in FIG. 11, is for the output voltage Vs to be modulated by a wave having the operating frequency of the converter fc.

Also in parallel, FIG. 13 shows the FIG. 12 vectors, the order of which is changed by a rearrangement aimed at grouping together the vectors whose modules are adjacent. The effect, as shown in FIG. 13 is therefore a resultant Vs2 of amplitude that is greater than in the above case.

The ripple in the output voltage Vs, shown in FIGS. 10 and 11, like the presence of a vector Vs1 or Vs2 in FIGS. 12 and 13, manifests a disturbing voltage originating from the differences in the charges on the capacitors of the converter. The invention consisting in effecting the re-arrangement shown in FIGS. 11 and 13 increases the disturbing voltage, especially at the chopper frequency fc of the converter. Insofar as this voltage causes a current, the current acts on the charges of the capacitors in a direction such that the charge differences that generate it are spontaneously dissipated. And insofar as the re-arrangement consists in reinforcing the amplitude of the disturbing output voltage, this contributes to accelerating the dissipation, and therefore the reduction in the charge differences.

The re-arrangement described above with reference to FIGS. 10 to 13 can easily be implemented by using an appropriate control algorithm making use of the voltages or charge differences of the capacitors by comparing them and sorting them in a centralized control circuit such as the circuit shown in FIG. 9.

The effect of these measures may be further increased by adding a tuned load CR to the FIG. 1 converter, as shown in FIG. 14, the tuned load being an inductor, a resistor, and a capacitor in series and having low (almost zero) impedance at the chopper frequency of the converter. It can be understood that, regardless of the load C, the tuned load CR offers a low-impedance path to the current caused by the disturbing voltage at the chopper frequency of the converter fc, and thus contributes to re-balancing the charge voltages across the capacitors of the converter.

Furthermore, naturally the same measures may be applied as regards the components of the disturbing voltage at frequencies that are multiples of the converter chopper frequency fc. These components may be represented by vector diagrams that are similar to the FIG. 13 diagram, and the invention may be applied to them, in particular by providing an additional matched load, alongside the matched load CR shown in FIG. 14.

Naturally, the above descriptions are given purely by way of non-limiting example, and the numerical values, in particular, can change with each application.

We claim:

1. A multilevel converter comprising, in particular, between a voltage source and a current source, a succession of controllable switching cells, each having two switches, with one pole of each of the two switches forming part of a pair of upstream poles and the other pole of each of the switches forming part of a pair of downstream poles, the pair of downstream poles of an upstream cell being connected to the pair of upstream poles of a downstream cell, and the pair of upstream poles of a first cell being connected to said current source, while the pair of downstream poles of a last cell is connected to said voltage source, the converter also comprising a respective capacitor for each cell, each capacitor being connected between the two poles constituting the pair of downstream poles of its cell, the converter also comprising control means governing the nominal operation of the converter and acting on the switches of the successive cells in such a manner that the two switches of any one cell are always in respective opposite conduction states, such that in response to a cell control signal delivered by said control means, one of the two switches in a given cell is successively in a first conduction state commencing at a first time position and then in a second conduction state during a cyclically repeated converter period, and such that in response to cell control signals that are identical but offset in time by a fraction of said period, the switches of successive cells function respectively in the same manner but offset in time by said fraction of a period, the successive capacitors having respective increasing nominal mean charge voltages, the nominal mean charge voltage of the capacitor in each of said cells being equal to the product of a voltage from said voltage source multiplied by the reciprocal of the number of cells and by the rank of the cell, the converter including additional control means organized to change, on command, said time position of said first conduction state of one or more cells.

2. A multilevel converter according to claim 1, wherein said change in the time position of the said first conduction state of one or more cells includes a change in the operating order of the cells of the converter during a chopper period of the converter, aimed at grouping together operation of the stages of the converter that manifest same-direction charge differences.

3. A multilevel converter according to claim 2, wherein a re-balancing load is connected in parallel to said current source, in the form of a series impedance tuned to the chopper frequency of the converter, so as to increase the current resulting from said overall disturbing component.

4. A multilevel converter according to claim 1, including difference-measuring means for measuring, for each of said capacitors, any difference between the evaluated mean charge voltage and the nominal mean charge voltage of the capacitor, as well as additional control means for changing the time position of said first conduction state of one or more cells of the converter in a direction such that said measured difference is reduced.

5. A multilevel converter according to claim 4, wherein said means for evaluating the voltage across the terminals of each capacitor comprise a voltmeter network connected across the two terminals of the current source.

6. A multilevel converter according to claim 4, wherein said means for evaluating the voltage across the terminals of each capacitor comprise a voltmeter network connected across the two terminals of a switch in each cell.

7. A multilevel converter according to claim 4, wherein each of the difference-measuring means includes means for receiving the value of the voltage of the voltage source, the rank of the stage and the number of stages so as to determine what the nominal charge voltage of each capacitor consequently ought to be in an operating period of the converter, said difference then being measured on each capacitor of the converter by comparator means subtracting said mean voltage evaluated across the terminals of each capacitor from said nominal charge voltage of the capacitor.

8. A multilevel converter according to claim 4, wherein said means for evaluating the voltage across the terminals of each capacitor comprise a voltmeter network connected across the two terminals of the capacitor.

9. A multilevel converter according to claim 1, wherein said change in the time position of said first conduction state of one or more cells is effected by advancing or retarding said first conduction state, without changing the operating order of the cells of the converter.

10. A multi-level converter according to claim 9, including difference-measuring means for measuring, for one of said capacitors, any difference between the evaluated means charge voltage and the nominal mean charge voltage of the capacitor, as well as an additional control circuit for changing the time position of said first conduction state of the cell of the converter containing the capacitor in a direction such that said measured difference is reduced.

11. A multilevel converter according to claim 10, wherein each of said additional control means receives, in addition to said difference signal, a measurement of the current forced by said current source and a constant expressing the capacitance of one of said capacitors that is associated with it, and computes accordingly a change in the time position of said first conduction state of the cell associated with the capacitor, which change is such that it generates additional charge in the capacitor compensating for said charge difference.

12. A multilevel converter according to claim 10, wherein each of said additional control means also receives a modulating signal, and changes accordingly the duration of said first conduction state of the cell associated with the capacitor, so that, with all of said additional control means acting likewise, said current source receives a mean voltage modulated according to said modulating signal.

13. A multilevel converter according to claim 10, wherein each of said additional control means receives from an adjacent additional control means a change signal established therein and defining a change that the adjacent additional control means makes to said time position of said first conduction state of the cell associated with it, so that the additional control means in question changes accordingly said time position of said first conduction state of the cell specific to it, in a direction that compensates, in the capacitor associated with that cell, the effect of said change made in the adjacent cell.

14. A multilevel converter according to claim 10, wherein, in addition to receiving said difference signal, each of said additional control means receives a measurement of the current forced by said current source and a constant expressing the capacitance of an associated one of said capacitors, as well as a converter mark-space ratio variation command, and it computes accordingly a change in the time position of said first conduction state of the cell associated with the capacitor, the change being such that it generates, across the terminals of said current source, a mean voltage variation that satisfies said command.

15. A multilevel converter according to claim 1, wherein said respective capacitor of said last cell comprises said voltage source.

* * * * *